June 13, 1939.  G. L. SCHIDING  2,162,643
ANTISKID DEVICE FOR VEHICLES
Filed Jan. 26, 1939  2 Sheets-Sheet 1

George L. Schiding,
INVENTOR

BY Victor J. Evans & Co.
ATTORNEYS

WITNESS

June 13, 1939.  G. L. SCHIDING  2,162,643

ANTISKID DEVICE FOR VEHICLES

Filed Jan. 26, 1939  2 Sheets—Sheet 2

George L. Schiding, INVENTOR

BY Victor J. Evans & Co.
ATTORNEYS

Patented June 13, 1939

2,162,643

UNITED STATES PATENT OFFICE 2,162,643

ANTISKID DEVICE FOR VEHICLES

George Lewis Schiding, York, Pa.

Application January 26, 1939, Serial No. 252,969

4 Claims. (Cl. 188—5)

The present invention relates to improved anti-skid devices for vehicles.

An important object of the invention is to provide anti-skid means associated with the axle of a vehicle adapted to be actuated from the interior of the vehicle to arrest and stop motion of the same on icy and slippery surfaces.

Another object of the invention is to provide an anti-skid device that may be easily and quickly positioned on or removed from the axle of a vehicle, said device being secured by means of the same bolts employed for retaining the wheels on the axle.

A further object of the invention is to provide an anti-skid device comprising a pair of spaced members mounted on the axle of a vehicle and in close proximity with the wheel supported thereon. Ground engaging segmental shaped members are loosely mounted within the spaced members and are held in associated relation by spring means which permit movement of said members within a certain area. A circular ring is also supported within the pair of spaced members, the outer periphery of which is normally held in contact with the segmental shaped members. Suitable means is provided, operated from within the interior of the vehicle to cause the ring to be urged outwardly to force at least one of the segmental shaped members outwardly into contact with the ground. The segmental shaped members having ground engaging roughened portions will effectively aid in arresting the motion of the vehicle when endeavoring to stop the same on a slippery roadway or similar surface.

The invention will be fully and comprehensively understood from a consideration of the following detailed description when read in connection with the accompanying drawings which form a part of the application.

Figure 1:
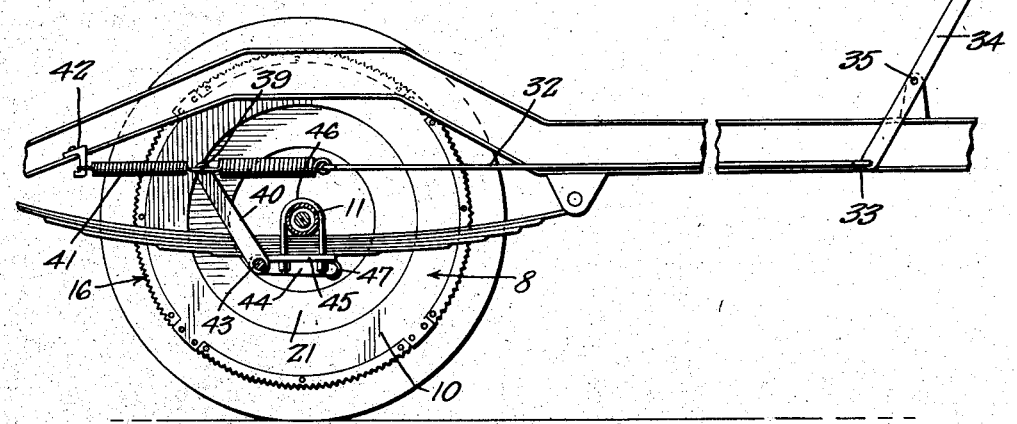
Figure 1 is a fragmentary side elevational view of the device attached to a vehicle.
Figure 2:
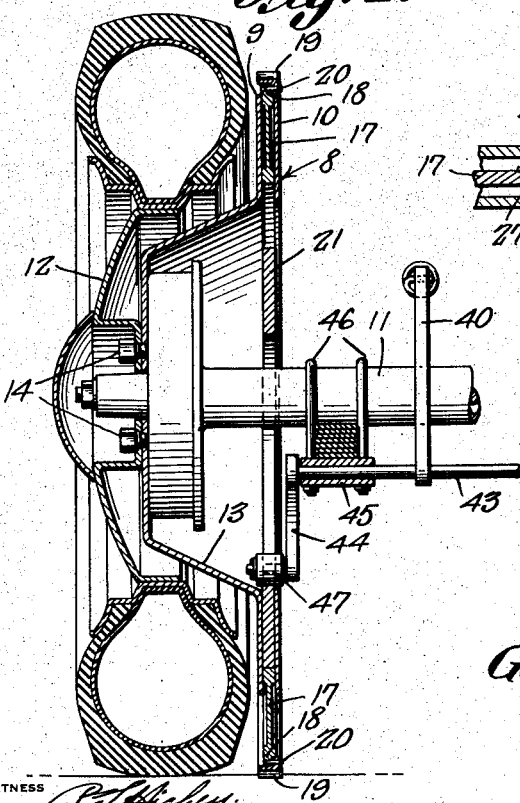
Figure 2 is an enlarged sectional view thereof.

Referring to the drawings for a more detailed description thereof, it will be seen that the anti-skid device indicated generally by the reference numeral 8 includes a pair of spaced members 9 and 10, respectively, supported on the axle 11 and in close proximity with the vehicle wheel 12. For purposes of illustration, the device is shown associated with a single wheel supported on the rear axle of the vehicle. It is to be understood, however, that the device is best adapted for use with both rear wheels which may be simultaneously actuated from the interior of the vehicle to force a portion of the devices into engagement with the ground. The devices are identical in construction and it is, therefore, believed only necessary to describe the one shown.

The member 9 is formed with an intermediate drum-shaped portion 13, disposed over the axle 11 and within the wheel 12 and is held on said axle by the bolts 14, conventionally employed for holding the wheel on the axle. The member 10 is substantially ring-shaped and is held in spaced relation on the member 9, said ring being formed with an enlarged opening which surrounds the axle 11 and which is substantially equal in diameter to the opening formed in the drum-shaped portion of the member 9. The members 9 and 10 are bolted or otherwise secured together through the lugs 15 formed in spaced relation on said members, said lugs also serving as stops for limiting the movement of the segmental shaped members 16 to be hereinafter more fully described.

The segmental shaped members 16 are adapted to be urged outwardly for contact with the ground to prevent skidding of the vehicle, and said members are loosely held in spaced relation between the members 9 and 10. Each member comprises a segmental portion 17 supported between the members 9 and 10, the outer periphery of which is formed with a reduced section 18 to which the gripping members 19 are bolted or otherwise attached at 20. The gripping members 19 are formed with teeth or other roughened surface for gripping the ground when coming in contact therewith. It will be noted that the segmental shaped members including the above elements are disposed between the spaced lugs 15, one member being disposed between each pair of lugs.

The several members are normally held in position within the members 9 and 10 by means of the ring 21, the outer periphery of which contacts the inner periphery of the portion 17. It is to be understood that the ring 21 is also loosely held between the flange portions of the members 9 and 10 as clearly shown in the drawings.

Figure 5:
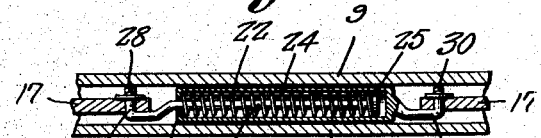
Figure 5 is a detailed sectional view of the means for connecting the segments in expanding relation.
Figure 6:
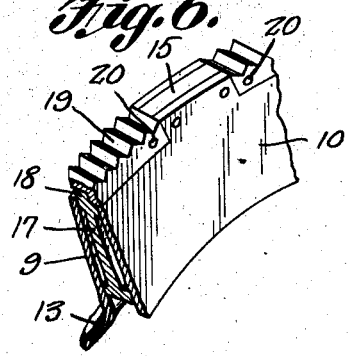
Figure 6 is a fragmentary perspective view illustrating the relation of the segments within the spaced members.
Figure 3:
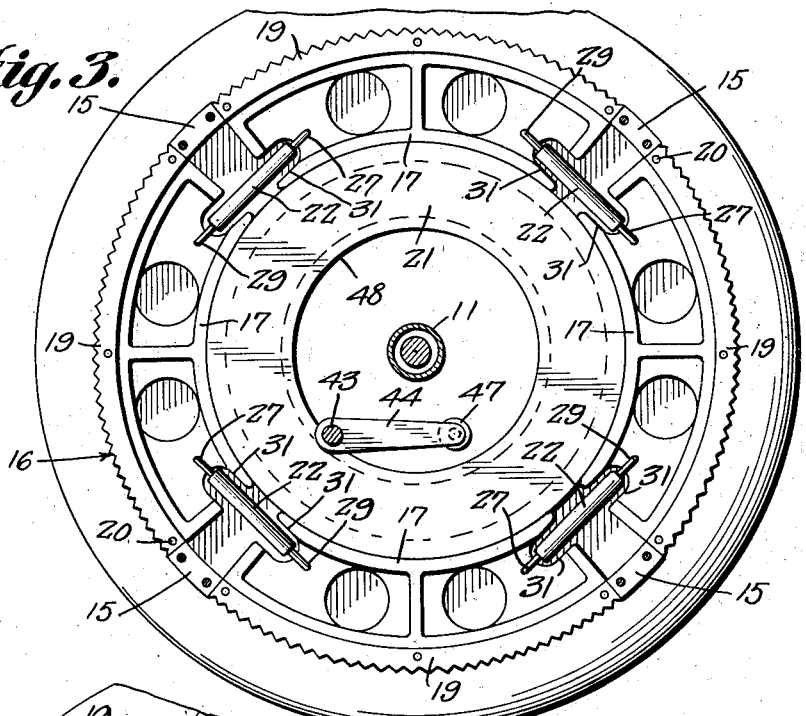
Figure 3 is a side elevational view of the device mounted on the axle of a vehicle and shown in normal position.

As is to be understood, the segmental shaped members are adapted to be urged outwardly for contacting the ground, and suitable means is provided for supporting said members in expanded relation. Referring particularly to Figure 5 of the drawings, it will be noted that within the members 9 and 10 and supported between the portion 17, there is provided a cylindrical shaped sleeve 22 supporting therein a rod 23 and tension spring 24. One end of the rod 23 is formed with an enlarged portion 25 for retaining the spring 24, said rod projecting through an opening 26 formed in one end of said sleeve. The projecting end of the rod 23 is fixedly secured within the portion 17, said end being hook-shaped as indicated at 27 for engagement with the portion 17 and locked thereon by means indicated generally at 28. The closed end of the sleeve 22 is also formed with a hook-shaped portion 29 projecting therefrom and locked at 30 to the adjacent segmental portion 17. When one of the members 16 is urged outwardly its associated rod 23 will move transversely within the sleeve 22 against the tension of the spring 24 and, upon release of pressure on the actuating means, the spring 24 will return the expanded member to normal position. As clearly shown in Figures 3 and 4 of the drawings, one of the sleeves 22 and its associated parts is disposed between each pair of the members 16, the ends of said members being cut out as indicated at 31 for the reception of the hook-shaped ends 27 and 29, respectively.

Figure 4:
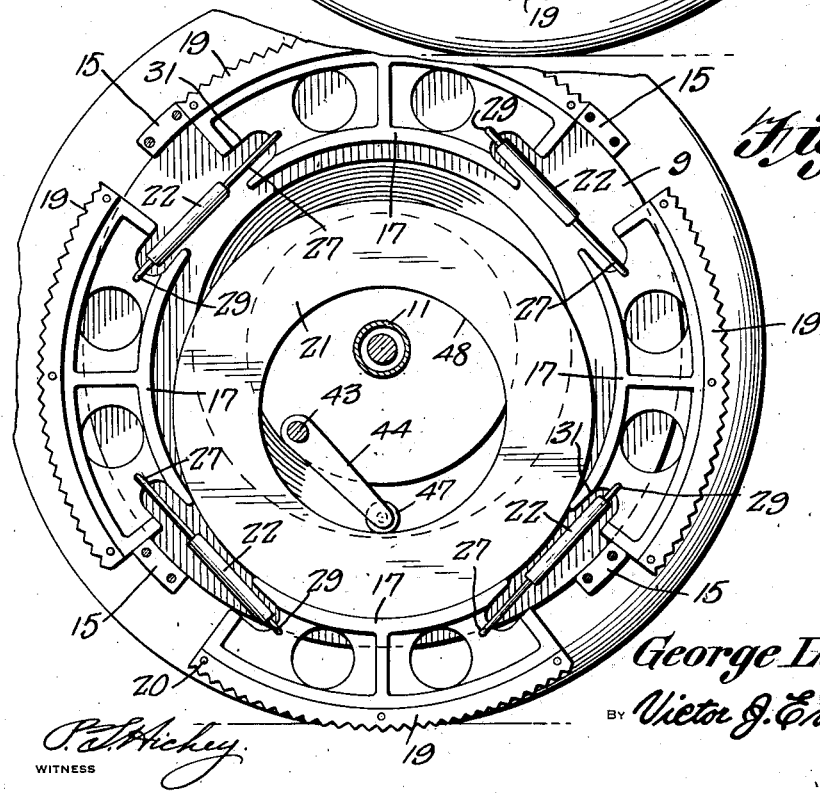
Figure 4 is a view similar to Figure 3 with the device in operative position.

The ring 21, loosely held within the members 9 and 10 is the means employed for urging the members 16 into ground engagement, each member operating independently of its adjacent member as the axle and wheel are revolving. A rod 32 extends along the chassis of the vehicle and has one end 33 attached to a lever 34 fulcrumed to the chassis at 35 and extending upwardly through the front floorboard of the vehicle. A toothed bar 36 is slidably disposed through the dashboard 37 of the vehicle and is attached at 38 to the lever 34. The other end 39 of the rod 32 is attached to a lever 40, which lever is also associated with a tension spring 41 attached to the chassis at 42. The lever 40 is attached to a rod 43 which extends to both rear wheels of the vehicle and carries on each end thereof a bell crank lever 44, said ends being supported in a bearing 45 forming a part of the spring supporting shackle 46. A roller 47 extends at right angles from the lever 44 and is maintained in engagement with the inner periphery 48 of the ring 21. Pulling forwardly on the end 49 of the bar 36 actuates the rod 32 and lever 40 against the tension of the spring 41 to rotate the rod 43 to cause the lever 44 and roller 47 to exert pressure downwardly on the ring 21. As pressure is exerted downwardly on the ring 21, said ring being in engagement with the segmental shaped members 16, will force the lowermost member as shown in Figure 4 of the drawings, downwardly into engagement with the ground. As the wheel and axle continue to revolve, the succeeding segmental shaped members will also be forced downwardly by the ring 21 until the motion of the vehicle has been arrested. The connecting sleeves 22 will, in the meantime return the expanded member 16 to normal position as hereinabove described. As soon as motion of the vehicle has been arrested the bar 36 is pressed inwardly to release pressure on the ring 21 thereby returning said ring to normal position. In view of the fact that the major portion of the ring will at all times be confined within the area of the spaced members 9 and 10, said ring will be guided by said members when returning to normal position.

It will thus be seen that there is provided an anti-skid device adapted to be associated with each rear wheel of a vehicle and in which both devices are simultaneously actuated from the interior of the vehicle. The segmental shaped members comprising the ground engaging portions of the device and the actuating ring being at all times confined within the area of the spaced members will be constantly maintained in position for free motion. The device being directly attached to the vehicle through the medium of the bolts employed for attaching the wheels of the vehicle to the axle will be caused to rotate in unison with the wheels. Thus as the wheels rotate the lowermost segment will be urged into contact with the ground when actuating the ring 21. The manner of connecting the segmental shaped members assures their return to normal position as soon as pressure has been released thereon.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed is:

1. An anti-skid device comprising, a supporting frame adapted for attachment with the axle of a vehicle, said frame including spaced members having parallel flanges thereon, a ring surrounding said axle and supported within said parallel flanges, a plurality of segmental shaped members movably supported within said flanges and normally held in contact with the outer periphery of said ring, and means associated with said ring for urging the same outwardly whereby at least one of said segmental shaped members is forced into contact with the ground.

2. An anti-skid device comprising, a supporting frame adapted for attachment with the axle of a vehicle, said frame including spaced members having parallel flanges thereon, one of said members having the intermediate portion thereof flared outwardly for close association with a wheel carried on said axle, a ring surrounding said axle and loosely held within said parallel flanges, a plurality of segmental shaped members movably held within said flanges and normally supported in contact with the outer periphery of said ring, and means associated with said ring for urging the same outwardly whereby at least one of said segmental shaped members is forced into contact with the ground.

3. An anti-skid device comprising, a supporting frame adapted for attachment with the axle of a vehicle, said frame including spaced members having parallel flanges thereon, a ring surrounding said axle and supported within said parallel flanges, a plurality of segmental shaped members movably supported within said flanges and normally held in contact with the outer periphery of said ring, means for maintaining said segmental shaped members in expanding relation, said means mounted within said parallel flanges, and means associated with said ring for urging the same outwardly whereby at least one of said segmental members is forced into contact with the ground.

4. An anti-skid device comprising, a supporting frame adapted for attachment with the axle of a vehicle, said frame including spaced members having parallel flanges thereon, a ring surrounding said axle and supported within said parallel flanges, a plurality of segmental shaped members movably supported within said flanges and normally held in contact with the outer periphery of said ring, means for maintaining said segmental shaped members in expanding relation, said means including a hollow cylindrical shaped sleeve, a tensioned rod slidably disposed within said sleeve and having an end connected to said segmental shaped members, said sleeve carrying an arm engageable with the adjacent segmental shaped member, and means associated with said ring for urging the same outwardly whereby at least one of said segmental shaped members is forced into contact with the ground.

GEORGE LEWIS SCHIDING.